United States Patent
Olarig et al.

(10) Patent No.: US 10,915,469 B2
(45) Date of Patent: Feb. 9, 2021

(54) METHOD AND APPARATUS FOR SUPPORTING A FIELD PROGRAMMABLE GATE ARRAY (FPGA) BASED ADD-IN-CARD (AIC) SOLID STATE DRIVE (SSD)

(71) Applicant: Samsung Electronics Co., Ltd., Suwon-si (KR)

(72) Inventors: Sompong Paul Olarig, Pleasanton, CA (US); Fred Worley, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/115,338

(22) Filed: Aug. 28, 2018

(65) Prior Publication Data

US 2019/0278720 A1 Sep. 12, 2019

Related U.S. Application Data

(60) Provisional application No. 62/641,253, filed on Mar. 9, 2018.

(51) Int. Cl.
*G06F 13/16* (2006.01)
*G06F 3/06* (2006.01)

(52) U.S. Cl.
CPC .......... *G06F 13/1668* (2013.01); *G06F 3/061* (2013.01); *G06F 3/0655* (2013.01); *G06F 3/0679* (2013.01); *G06F 2213/0026* (2013.01); *G06F 2213/16* (2013.01)

(58) Field of Classification Search
CPC .......................... G06F 13/1668; G06F 3/0679
See application file for complete search history.

(56) References Cited

U.S. PATENT DOCUMENTS

| 9,252,985 | B2 | 2/2016 | Cho | |
|---|---|---|---|---|
| 9,501,110 | B2 | 11/2016 | Heyd et al. | |
| 9,678,910 | B2 | 6/2017 | Breakstone et al. | |
| 10,467,163 | B1 * | 11/2019 | Malwankar | H04L 49/356 |
| 2017/0220505 | A1 * | 8/2017 | Breakstone | G06F 11/2015 |
| 2017/0269871 | A1 | 9/2017 | Khan et al. | |

FOREIGN PATENT DOCUMENTS

| CN | 105677595 A | 6/2016 |
|---|---|---|
| WO | WO 2018/006393 A1 | 1/2018 |

* cited by examiner

*Primary Examiner* — David E Martinez
(74) *Attorney, Agent, or Firm* — Lewis Roca Rothgerber Christie LLP

(57) ABSTRACT

According to some example embodiments according to the present disclosure, a device includes a printed circuit board (PCB); a solid state drive (SSD) connected at a first side of the PCB via at least one SSD connector; at least one field programmable gate array (FPGA) attached to the PCB at a second side of the PCB; and at least one front end connector attached to the PCB at a third side of the PCB, wherein the device is configured to process data stored in the SSD based on a command received via the at least one front end connector.

12 Claims, 4 Drawing Sheets

METHOD AND APPARATUS FOR SUPPORTING A FIELD PROGRAMMABLE GATE ARRAY (FPGA) BASED ADD-IN-CARD (AIC) SOLID STATE DRIVE (SSD)

CROSS-REFERENCE TO RELATED APPLICATION(S)

The present application claims priority to and the benefit of U.S. Provisional Patent Application Ser. No. 62/641,253, filed Mar. 9, 2018 and entitled "METHOD AND APPARATUS FOR SUPPORTING A SINGLE FPGA+ADD IN CARD SSD COMPLIANT TO EXTENDED SFF AND PCIE FORM FACTORS," the entire content of which is hereby expressly incorporated by reference.

FIELD

One or more aspects of embodiments according to the present invention relate to network-attached devices, for example, a field programmable gate array (FPGA) based add-in-card (AIC) solid state drive (SSD).

BACKGROUND

Non-volatile memory express (NVMe) is a standard that defines a register-level interface for host software to communicate with a non-volatile memory subsystem (e.g., a solid state drive (SSD)) over a peripheral component interconnect express (PCIe) bus. NVMe is an alternative to the Small Computer System Interface (SCSI) standard for connecting and transferring data between a host and a peripheral target storage device or system. PCIe-connected NVMe SSDs allow applications to communicate directly to the storage.

The above information disclosed in this Background section is only for enhancement of understanding of the background of the invention and therefore it may contain information that does not constitute prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to method and apparatus for supporting a field programmable gate array (FPGA) based add-in-card (AIC) solid state drive (SSD).

According to some example embodiments according to the present disclosure, a device includes a printed circuit board (PCB); a solid state drive (SSD) connected at a first side of the PCB via at least one SSD connector; at least one field programmable gate array (FPGA) attached to the PCB at a second side of the PCB; and at least one front end connector attached to the PCB at a third side of the PCB, wherein the device is configured to process data stored in the SSD based on a command received via the at least one front end connector.

In some example embodiments, the SSD is a peripheral component interconnect express (PCIe) add-in-card (AIC) SSD, wherein the at least one SSD connector includes a first SSD connector and a second SSD connector, the first SSD connector being a vertical PCIe edge connector and the second SSD connector being a PCIe receptacle connector. In some example embodiments, a first side of the vertical PCIe edge connector is attached and electrically connected to the PCIe AIC SSD at a first side of the PCIe AIC SSD and a second side of the vertical PCIe edge connector is electrically connected and attached to a first side of the PCIe receptacle connector, a second side of the PCIe receptacle connector being electrically connected and attached to the first side of the PCB.

In some example embodiments, the device further includes a first structural support, a second structural support, a third structural support, and a fourth structural support, wherein the first structural support and the second structural support are located between the second side of the PCB and a first side of the SSD, and wherein the third structural support and the fourth structural support are located between the second side of the PCB and a first side of a metal casing, wherein the device is enclosed in the metal casing and the first structural support, the second structural support, the third structural support, and the fourth structural support are metal standoffs. In some example embodiments, a length of the SSD is 110 mm and a length of the device is between 110 mm and 142.2 mm. In some example embodiments, a first side of the at least one FPGA is attached to the second side of the PCB, the at least one FPGA is electrically connected to the PCB and performs one or more acceleration functions.

In some example embodiments, the device further includes a first interface layer attached at a second side of the SSD and a second interface layer attached at a second side of the at least one FPGA, wherein the first interface layer and the second interface layer are used to transfer heat generated by the SSD and the at least one FPGA during operation of the SSD and the at least one FPGA. In some example embodiments, a length of the PCB is equal to or longer than a length of the SSD. In some example embodiments, a length of the PCB is equal to or longer than a length of the at least one FPGA, the length of the at least one FPGA is 80 mm.

In some example embodiments, the SSD is a U.2 SSD or a SFF-TA-1008 SSD, wherein when the SSD is the U.2 SSD, the at least one SSD connector is a U.2 connector and when the SSD is the SFF-TA-1008 SSD, the at least one SSD connector is a SFF-TA-1008 connector. In some example embodiments, the at least one front end connector is an U.2 connector or a SFF-TA-1008 connector. In some example embodiments, a 7.5×76×104.9 mm SFF-TA-1008 connector supports up to 25 W, a 7.5×76×142.2 mm SFF-TA-1008 connector supports up to 35 W, a 16.8×76×104.9 mm SFF-TA-1008 connector supports up to 70 W, and a 16.8×76×142.2 mm SFF-TA-1008 connector supports up to 70 W.

In some example embodiments, a system includes a first interface layer; a solid state drive (SSD) attached to the first interface layer at a first side of the SSD; a printed circuit board (PCB) connected to a second side of the SSD, a first side of the PCB is connected to the second side of the SSD via at least one SSD connector; at least one field programmable gate array (FPGA) attached to the PCB at a second side of the PCB, wherein a first side of the FPGA is attached to the PCB; a second interface layer attached to the FPGA at a second side of the FPGA; and at least one front end connector attached to the PCB at a third side of the PCB, wherein the system is configured to process data stored in the SSD based on a command received via the at least one front end connector.

In some example embodiments, the SSD is a peripheral component interconnect express (PCIe) add-in-card (AIC) SSD, wherein the at least one SSD connector includes a first SSD connector and a second SSD connector, the first SSD connector being a vertical PCIe edge connector and the second SSD connector being a PCIe receptacle connector. In some example embodiments, a first side of the vertical PCIe edge connector is attached and electrically connected to the PCIe AIC SSD at a second side of the PCIe AIC SSD and a second side of the vertical PCIe edge connector is electrically connected and attached to a first side of the PCIe receptacle connector, a second side of the PCIe receptacle connector being electrically connected and attached to the first side of the PCB.

In some example embodiments, the system further includes a first structural support, a second structural support, a third structural support, and a fourth structural support, wherein the first structural support and the second structural support are located between the second side of the PCB and the second side of the SSD, and wherein the third structural support and the fourth structural support are located between the second side of the PCB and a first side of a metal casing, wherein the system is enclosed in the metal casing and the first structural support, the second structural support, the third structural support, and the fourth structural support are metal standoffs. In some example embodiments, a length of the SSD is 110 mm, a length of the system is between 110 and 142.2 mm, and a length of the at least one FPGA is 80 mm, the at least one FPGA performs one or more acceleration functions.

In some example embodiments, a method includes receiving, at a processing device, a command from a host device; receiving, at the processing device, a data set stored in a solid state drive (SSD) connected to the processing device via at least one SSD connector; processing, at the processing device, the data set received from the SSD based on the command received from the host device; and sending, by the processing device, one or more results from the processing of the data set received from the SSD to the host device.

In some example embodiments, the method further includes storing, at a plurality of storage devices located in proximity to the processing device, the data set received from the SSD, wherein the processing device is a field programmable gate array (FPGA) device and the plurality of storage devices located in proximity to the processing device are a plurality of DDR4 memories. In some example embodiments, the SSD is a peripheral component interconnect express (PCIe) add-in card (AIC) SSD, wherein the at least one SSD connector includes a first SSD connector and a second SSD connector, the first SSD connector being a vertical PCIe edge connector and the second SSD connector being a PCIe receptacle connector.

BRIEF DESCRIPTION OF THE DRAWINGS

These and other features of some example embodiments of the present invention will be appreciated and understood with reference to the specification, claims, and appended drawings, wherein:

DETAILED DESCRIPTION

Figure 1:
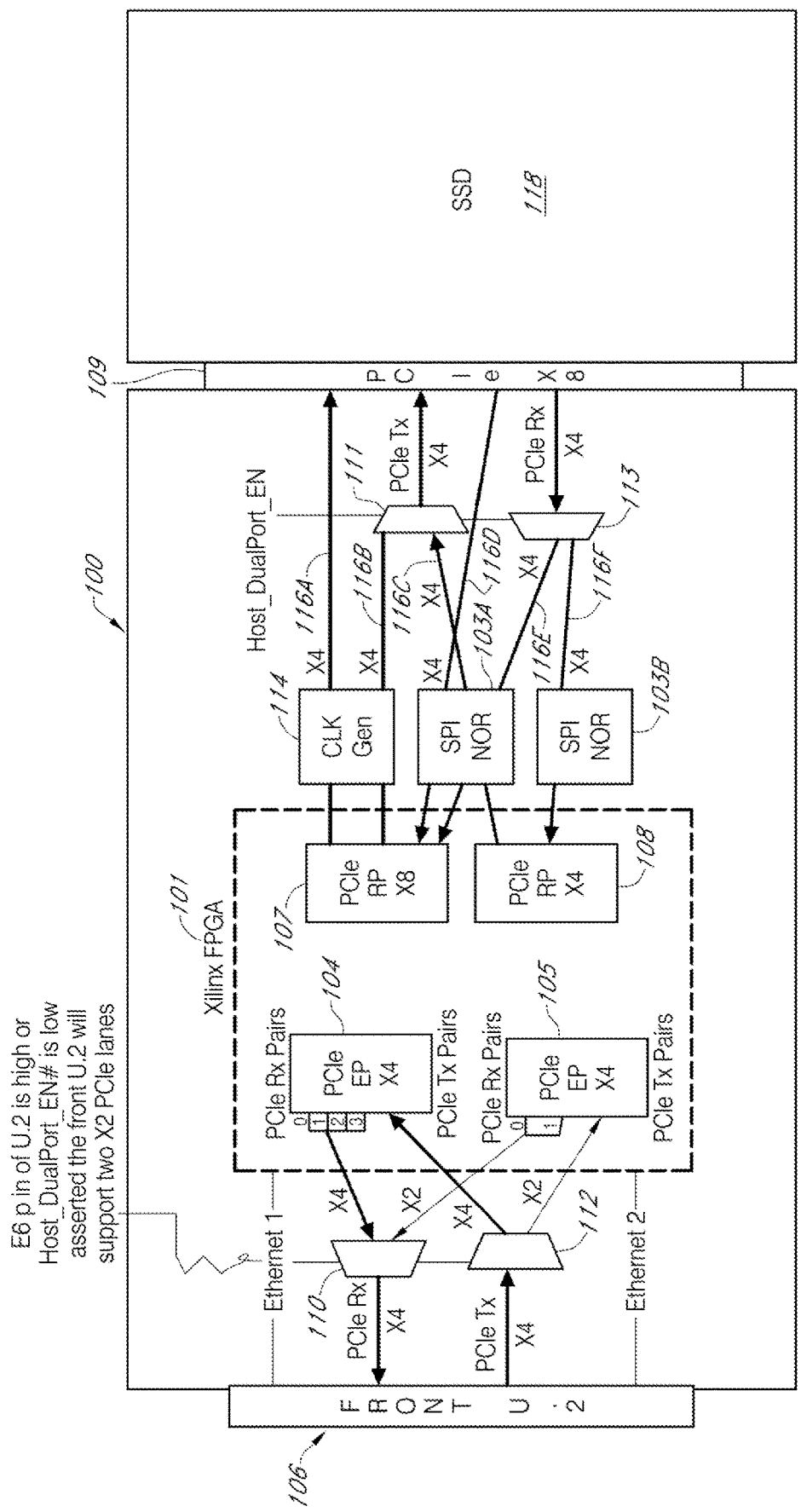
FIG. 1 illustrates a block diagram of an example PCIe add-in-card (AIC) connected to an SSD, according to some example embodiments of the present invention.

The detailed description set forth below in connection with the appended drawings is intended as a description of some example embodiments of a system and method for supporting a FPGA based add-in-card (AIC) SSD provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

NVMe is a standard that defines a register-level interface for host software to communicate with a non-volatile memory subsystem (e.g., an SSD) over a PCIe bus. NVMe is an alternative to the SCSI standard for connecting and transferring data between a host and a peripheral target storage device or system. PCIe-connected NVMe SSDs allow applications to communicate directly to the storage.

The physical connection of the NVMe is based on a PCIe bus. A typical SSD has a standard connector (e.g. U.2) to interface with a system via a mid-plane over the PCIe bus. An U.2 (SFF-8639) is a computer interface for connecting SSDs to a computer. An U.2 connector can support either two Serial Advanced Technology Attachment (SATA) or Serial Attached SCSI (SAS) ports and up to four lanes (X4) of parallel I/O in PCIe SSDs. If unused, the two PCIe lanes 1 and 2 may be optionally used as additional SAS ports if required. The U.2 connector is standardized for NVMe and supports PCIe 3.0 X4, providing five times the speed of a typical SATA SSD.

NVMe over fabric (NVMe-oF) is an extension to the NVMe standard enabling operation over a variety of fabrics (or interconnects) other than PCIe. Herein, the term "fabric", represents a network topology in which network nodes can pass data to each other through a variety of interconnecting protocols, ports, and switches. For example, Ethernet-attached SSDs may attach directly to a fabric, and in this case the fabric is the Ethernet.

NVMe-oF enables the use of alternate transports to PCIe that extend the distances across which an NVMe host device and NVMe storage drive or subsystem can connect. Therefore, NVMe-oF is a technology specification designed to enable nonvolatile memory express message-based commands to transfer data directly between a host computer and a target solid-state storage device (e.g., eSSD or NVMe-oF device) or system over a network, such as Ethernet, Fibre Channel (FC) or InfiniBand. When configured to support the NVMe-oF standard, a system can support various fabrics including not only Ethernet, but also, Fibre Channel, InfiniBand, and other network fabrics. For example, eSSDs may attach directly to a fabric, and in this case the fabric is the Ethernet. An eSSD may refer to an SSD that may support the NVMe-oF protocols.

The PCIe AIC SSDs are capable of reaching higher speeds than the SATA SSDs. The PCIe AIC SSDs are of the HHHL (Half Height Half Length)/FHHL (Full Height Half Length) AIC Form Factor with the higher bandwidth provided by the PCIe interface. In some example embodiments, PCIe 2.0 X1 may offer speed of 5 Gb/s, PCIe 2.0 X4 may offer speed of 20 Gb/s, and PCIe 2.0 X8 may offer speed of 40 Gb/s. As such, PCIe AIC SSDs may feature higher speeds than other SSDs available in the market. The large PCB in the PCIe AIC SSDs implies that there is room for a plurality of NANDs which equates to a very high capacity in a single drive. In PCIe AIC SSDs, there is also room for a heatsink, which may be useful in the enterprise world where drives are frequently under load for sustained periods of time.

In some configurations, the implementation of FPGA with PCIe SSDs requires two major components: i) an interposer board consisting of FPGA, DDR4 memory, SPI NOR, clock generator etc. and ii) standard NVMe SSDs such as AIC1725. In addition, the NVMe-oF SSDs (eSSDs) may be required to support NVMe protocol for backward compatibility. However, due to the fast PCIe link training which occurs automatically (by PCIe state machines at both ends) within 10 ms after PCIe reset, it may be challenging to implement similar function inside FPGA without modifying the existing PCIe IP. For example, the SSD may depend on FPGA (attached to the SSD) to decide what chassis (NVMe or NVMe-oF) the SSD is in or what protocol it is required to operate. In some examples, such determination may take several minutes resulting in violation of PCIe link training period of <120 mS after Reset has been de-asserted and may require another PCIe bus scan after FPGA bit file has been downloaded successfully. An FPGA based interposer may be able to support existing NVMe-based SSDs including PCIe form factor. Therefore, a cost effective FPGA based PCIe AIC SSD with low latency and high performance may be desired.

Embodiments of the present disclosure may include a storage device, for example, an FPGA based PCIe AIC SSD that is capable of supporting both NVMe and NVMe-oF protocols, and when in the NVMe-oF mode, the FPGA based PCIe AIC SSD may be able to operate in different Ethernet speeds from 10 Giga bit per second (Gbps) up to 100 Gbps or higher, without any changes to their hardware. In one configuration, the PCIe AIC SSD may be in an extended 2.5" small form factor SSD packed together with a single FPGA. The single FPGA may be able to support the AIC SSD to increase the performance while keeping the same FPGA cost. Additionally, the example embodiments of the present disclosure with at least one FPGA and a AIC SSD, may fit in existing and/or new SSD form factors (e.g., SFF-TA-1008 or standard PCIe card form factors, e.g., full-height, full length (FH-FL) card outline, or full-height, half length (FHHL) outline).

The different configurations of the present disclosure may also be compatible with technologies advancement such as 50 G and 100 G or higher, and PCIe 4.0. In particular, the different configurations of the present application provide a system that can support both the NVMe and NVMe-oF protocols, and an AIC SSD. Further, the different configurations of the present application may provide a disclosure regarding how the FPGA based AIC SSD understands where it has been deployed and what personality it should adopt as a result of its deployment in a particular place in the data set.

In some example embodiments, the FPGA based PCIe AIC SSD disclosed herein is a single common device that may be used in multiple systems compatible with NVMe and NVMe-oF standards. The FPGA based PCIe AIC SSD may use standard SSD connectors such as U.2 or SFF-TA-1008 to interface with the host device via the mid-plane. The unused SAS pins of U.2 connectors may be used to support 25 Gbps (100G-KR4) Ethernet. The FPGA based AIC SSD disclosed herein may be a device that may be used in multiple systems compatible with NVMe and NVMe-oF standards. As such, the FPGA based AIC SSD may also be referred to as a multi-mode device.

The FPGA based AIC SSD may support either NVMe or NVMe-oF standard by detecting product information from a known location (e.g., chassis type pin E6 of the U.2 which maybe driven directly from the motherboard or the mid-plane). For example, a vendor defined signal (e.g., a mode signal) on the U.2 connector may indicate to the FPGA drive whether to operate in NVMe or NVMe-oF mode. If present in an NVMe chassis, the PCIe X4 lane of the U.2 connector may be driven by the EEPROM of the AIC SSD controller (or FPGA controller). In this case, the device may disable the Fabric attached ports (e.g., Ethernet ports, Fibre Channel ports, or Infini Band ports) and all NVMe protocols and functionalities may be supported or enabled. If present in an NVMe-oF chassis, then the Fabric attached ports may be enabled by using only the unused and available SAS pins. Also in some example embodiments, when operating in dual port configurations, the FPGA based AIC SSD of the present disclosure may automatically configure and set up PCIe interface independent of FPGA.

FIG. 1 is a block diagram illustrating an example PCIe AIC 100 connected to an SSD 118, according to one embodiment. The PCIe AIC 100 may include a FPGA 101. The FPGA 101 may provide an interface between a front end U.2 connector 106 and the SSD 118 via a PCIe interface or PCIe X8 connector 109. The FPGA 101 may also be connected to a plurality of DDR4 memories located near the PCIe AIC 100. The FPGA 101 may be further connected to flash drives 103A-103B and a clock generator circuit 114. The front end U.2 connector 106 may be connected to the FPGA 101, via two internal PCIe X4 End Point (EP) 104 and 105 through two high speed multiplexers 110 and 112. The FPGA 101 is further connected to the U.2 connector 106 via two Ethernet connections (e.g., Ethernet 1 and Ethernet 2). The PCIe X4 EP 104 and the PCIe X4 EP 105 may be used to transmit signals or packets to a motherboard over a mid-plane via U.2 connector 106 through the multiplexer 110, and may be used to receive packets from a motherboard over a mid-plane via U.2 connector 106 through the multiplexer 112.

The FPGA 101 may interface with the SSD 118 via PCIe Root Port (RP) 107 and PCIe RP 108 connected to a plurality of PCIe X4 busses 116A-116F through two multiplexers 111 and 113 and a PCIe X8 connector 109. In one configuration, the PCIe X8 connector 109 may be a vertical or 90 degree connector to laterally connect the PCIe AIC PCB of the PCIe AIC 100 to the SSD 118. In some example embodiments, the PCIe X8 refers to a collection of eight PCIe express lanes. Therefore, the available bandwidth for the PCIe X8 connector may be twice the bandwidth available with the PCIe X4 connector. As such, the PCIe X8 connector 109 may support the higher IO (up to twice) throughput and bandwidth compared to a PCIe X4 connector. The SSD 118 connected to the FPGA 101 via the PCIe X8 connector 109 may also enable the FPGA 101 to achieve high acceleration due to increased bus bandwidth between FPGA 101 and SSD 118.

In some example embodiments, the PCIe AIC 100 connected to the SSD 118 may support both NVMe and NVMe-oF protocols, and when in the NVMe-oF mode, the FPGA based PCIe AIC 100 connected to the SSD 118 may be able to operate in different Ethernet speeds from 10 Gbps up to 100 Gbps or higher, without any changes to the hardware. In some example embodiments, the operational mode (NVMe or NVMe-oF) of the PCIe AIC 100 connected to the SSD 118 may be self-configured or externally set using a physical pin (e.g., a Pin E6 of U.2 connector 106 may be used as a chassis type pin indicating the protocol (NVMe or NVMe-oF) that may be used on the chassis) or by an in-band (vendor defined) command from a baseboard management controller (BMC) of the motherboard. The manageability information retrieved through Ethernet via the Ethernet connectors Ethernet 1 and Ethernet 2 is referred to as "in-band" information whereas the manageability information retrieved through one or more PCIe X4 busses (e.g., 116A-116F) is referred to as "out-of-band" information.

In some example embodiments, when configured as an NVMe-oF device, i.e., when the chassis type pin E6=high, the multi-mode PCIe AIC 100 connected to the SSD 118 may be configured in either the single port NVMe-oF mode or the dual port NVMe-oF mode. In the single port NVMe-oF mode, the pin E25 of U.2 connector 106 may be high (not asserted or not active) and in the dual port NVMe-oF mode, the pin E25 of U.2 connector 106 may be asserted low or active. In some configurations, the different operating speeds of the PCIe AIC 100 connected to SSD 118 may be accomplished by using two additional GPIO (Espeed [1:0]) located on the mid-plane or CPLD which may be controlled by one or more internal registers inside the FPGA 101.

In some example embodiments, an efficient in-storage computing may be achieved by using the FPGA based PCIe AIC 100 connected to the SSD 118 where, (part of) data-intensive processing may be moved from the host CPU to the PCIe AIC 100, which is close to the data source (e.g., SSD 118) itself ("in-storage processing"). The in-storage processing approach using the PCIe AIC 100 close to the data source (e.g., SSD 118) may drastically reduce the amount of data to be transferred to the host, and in turn, may ensure all components (e.g., PCIe AIC 100) along the data path in the SSD 118 are utilized in a balanced way. In some example embodiments, in-storage processing outperforms conventional CPU based processing by over 13 times for scan operation. In some other example embodiments, in-storage processing may offer sizable energy savings of up to 7 times.

For example, when the PCIe AIC 100 connected to the SSD 118 is operating in a hardware acceleration mode, the host device connected to the PCIe AIC 100 via the front end U.2 connector 106, may need an image or a specific file that is stored in the SSD 118. In such a case, the host device may send a command to the FPGA 101 in the PCIe AIC 100 requesting the image or the specific file stored in the SSD 118. Upon receiving such a command from the host device, instead of transferring the entire data set stored in the SSD 118 to the host device for the host CPU to process the data and recover the requested image or file, one or more local CPUs located near the PCIe AIC 100 may transfer the entire or partial data set stored in the SSD 118 to the PCIe AIC 100 and process the transferred data from the SSD 118 to determine the requested image or specific file. The transferred data from the SSD 118 may be stored temporarily in the plurality of DDR4 memories located near the PCIe AIC 100, during the processing of the transferred data from the SSD 118 by the one or more local CPUs located near the PCIe AIC 100. Once the transferred data from the SSD 118 is processed successfully, the FPGA 101 in the PCIe AIC 100 may return the final result (e.g., the requested image or file) of the processing operation to the host device. In some example embodiments, the results from the intermittent steps of the processing operation by the one or more local CPUs located near the PCIe AIC 100 may be stored in the plurality of DDR4 memories located near the PCIe AIC 100.

Therefore, the amount of data transferred between the FPGA 101 in the PCIe AIC 100 and the host device may be much less than the amount of data transferred between the FPGA 101 in the PCIe AIC 100 and the SSD 118, which in turn may save the energy and bandwidth that may have been required to transfer the data stored in the SSD 118 to the host memory and from the host memory to the host CPU device. In some example embodiments, energy required to transfer data from an external storage (e.g., SSD) to a host device may be 10,000 times more than the energy required to transfer data between a storage device (e.g., SSD) and an FPGA directly connected to the storage device. As such, the different example embodiments of the present disclosure may provide a faster and more energy efficient solution of processing data in a storage device, for example, SSD 118.

Figure 2:
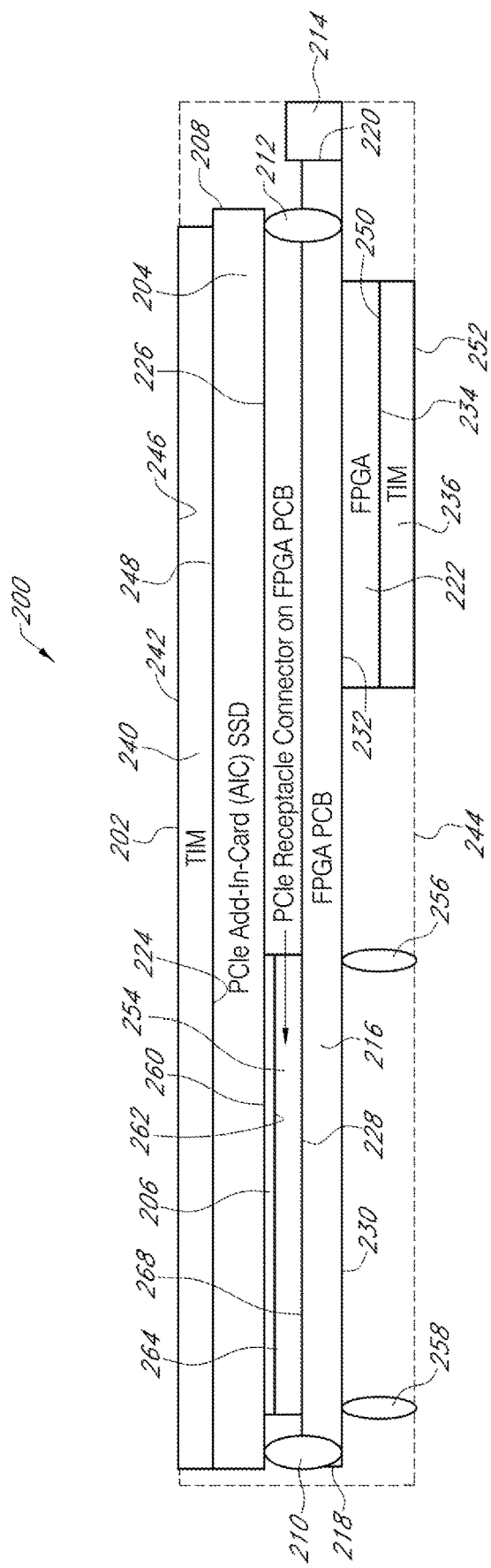
FIG. 2 illustrates a cross sectional view of a device in a metal casing, according to some example embodiments of the present invention.

FIG. 2 illustrates a cross sectional view of a device 200 in a metal casing 202. The device 200 may be the PCIe AIC 100 connected to the SSD 118 of FIG. 1. The device 200 includes a metal casing 202, a first thermal interface material (TIM) layer 240, an SSD module 204, a vertical (90°) PCIe edge connector 206, a PCIe receptacle connector 254, a plurality of metal supports or standoffs (or screws) 210, 212, 256, 258, an FPGA PCB 216, an FPGA 222, a second TIM layer 236, and a front end connector 214 such as U.2 connector.

In the example embodiment of FIG. 2, a first side 246 of the first TIM layer 240 is attached to (or in thermal contact with) a first side 242 of the metal or thermal conductive metal casing 202. A second side 248 of the first TIM layer 240 is attached to (or in thermal contact with) a first side 224 of the SSD module 204. The SSD module 204 is connected to the FPGA PCB 216 via the vertical (90°) PCIe edge connector 206 and the PCIe receptacle connector 254. A first side 260 of the vertical (90°) PCIe edge connector 206 is attached and electrically connected to the SSD module 204 at a second side 226 of the SSD module 204. The vertical (90°) PCIe edge connector 206 is attached to the SSD module 204 at a right angle. A second side 262 of the vertical (90°) PCIe edge connector 206 is electrically connected and attached to a first side 264 of the PCIe receptacle connector 254. A second side 268 of the PCIe receptacle connector 254 is electrically connected and attached to a first side 228 of the FPGA PCB 216. In some example embodiments, the length of the SSD module 204 may be standard length (e.g., 110 mm) and the length of the device 200 may be longer than 110 mm. In an example, the length of the FPGA PCB 216 may be equal to or longer than the length of the SSD module 204.

In an example, a first metal (or other suitable insulating material) support or standoff 212, that provides structural support to the SSD module 204, may be located between a second side 230 of the FPGA PCB 216 and the second side 226 of the SSD module 204. The first metal support or standoff 212 may be located adjacent to the fourth side 220 of the FPGA PCB 216 and a third side 208 of the SSD module 204. A second metal support or standoff 210, that provides structural support to the SSD module 204, may also be located between a second side 230 of the FPGA PCB 216 and the second side 226 of the SSD module 204. The second metal support or standoff 210 may be located adjacent to the third side 218 of the FPGA PCB 216. A third metal standoff 258 and a fourth metal standoff 256 may be located between the second side 230 of the FPGA PCB 216 and a second side 244 of the metal casing 202 to provide structural support to the FPGA PCB 216.

In the device 200 of FIG. 2, the second side 230 of the FPGA PCB 216 is attached to a first side 232 of the FPGA 222. In an example, the FPGA 222 may be mounted on or attached to the second side 230 of the FPGA PCB 216 and electrically connected to the FPGA PCB 216. A second side 234 of the FPGA 222 is attached to (or in thermal contact with) the second TIM layer 236 at a first side 250 of the second TIM layer 236. A second side 252 of the second TIM layer 236 is attached to (or in thermal contact with) the second side 244 of the metal casing 202. The first TIM layer 240 and the second TIM layer 236 may be used to spread and dissipate the heat generated by the electronic devices such as SSD module 204 and by the FPGA 222 during the normal operation of the SSD module 204 and the FPGA 222, to prevent overheating of the device 200 by transferring the generated heat to outside of the device 200 via the metal casing 202. In an example, the length of the second TIM layer 236 may be equal to or longer or slightly smaller than the length of the FPGA 222. Additional pieces of TIM may be required for other electronic devices such as DDR4 memory. In some example embodiments, the length of the FPGA 222 is 80 mm.

In some example embodiments, the SSD module 204 may be a PCIe SSD module (e.g., PCIe AIC SSD as shown in FIG. 2), a U.2 SSD module (e.g., in such a case the connector 206 will be replaced with a U.2 connector), or a SFF-TA-1008 SSD module (e.g., in such a case the connector 206 will be replaced with a SFF-TA-1008 connector). In some example embodiments, the SSD module may include a plurality of storage elements (e.g., NAND), a controller, and one or more connectors. In some example embodiments, an SSD device may include an SSD module within a casing.

In an example, a front end connector 214 is mounted on (or attached to) and electrically connected to the FPGA PCB 216. In one configuration, the device 200 may support, via the front end connector 214, e.g., a U.2 connector, a plurality of SAS ports (e.g., SAS0 and SAS1) and up to four PCIe X4 lanes of a PCIe X4 bus. The two SAS ports (SAS0 and SAS1) are unused by the device 200 and may be used as Ethernet ports by the device 200 when operating in NVMe-oF mode. The device 200 may be able to operate in different Ethernet speeds from 10 Gbps up to 100 Gbps or higher, without any changes to the hardware.

In some example embodiments, a SFF-TA-1008 connector may be used as the front end connector 214 to connect the device 200 with a mid-plane. In some example embodiments, the length of the device 200 may be between 110 mm and 142.2 mm. Such length may enable the device 200 to support a SFF-TA-1008 connector (in place of the U.2 connector) to connect the SSD module 204 with a mid-plane. In some example embodiments, a 7.5×76×104.9 mm SFF-TA-1008 connector may support up to 25 W, a 7.5× 76×142.2 mm SFF-TA-1008 connector may support up to 35 W, a 16.8×76×104.9 mm SFF-TA-1008 connector may support up to 70 W, and a 16.8×76×142.2 mm SFF-TA-1008 connector may support up to 70 W.

Figure 3:
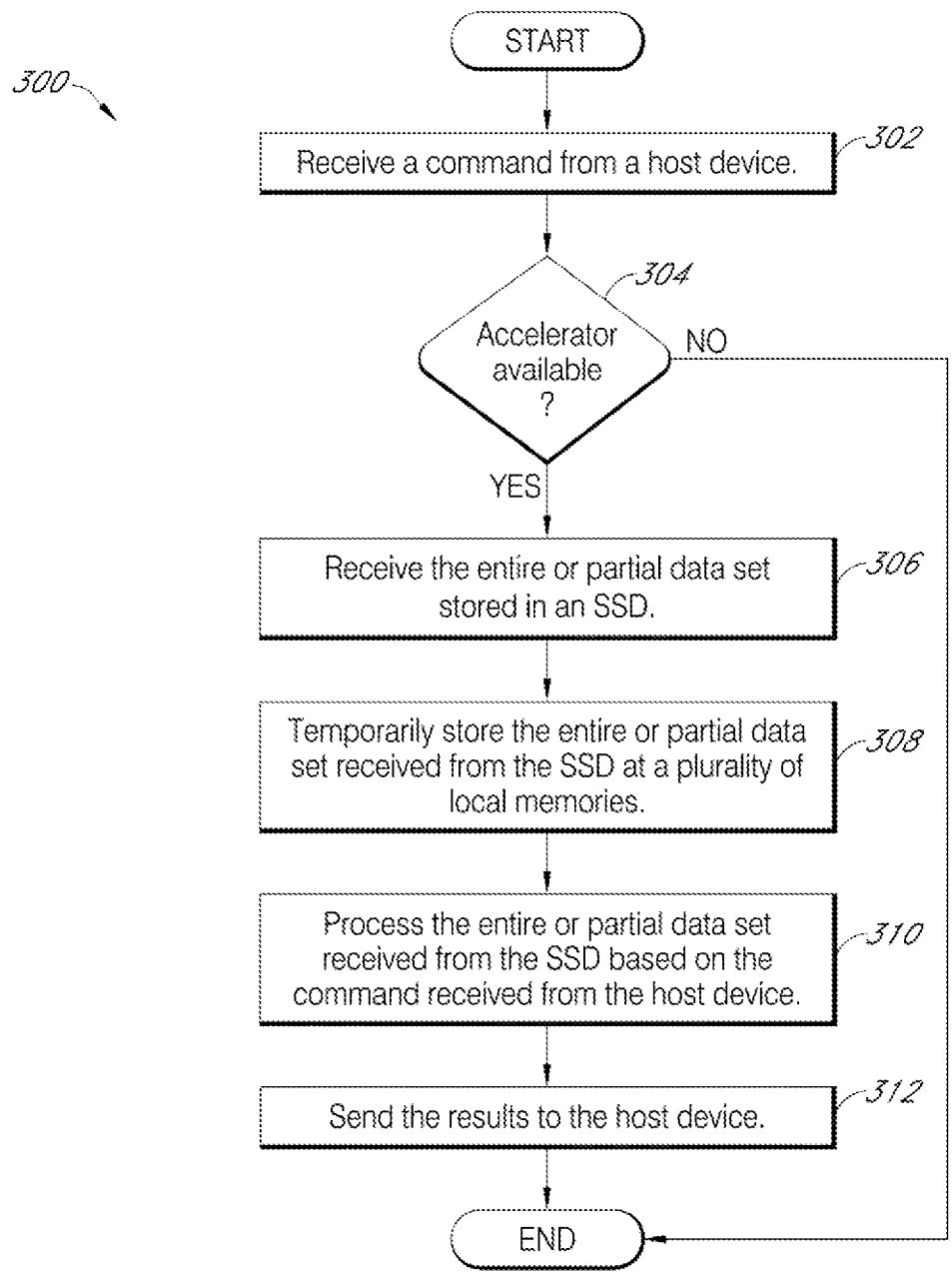
FIG. 3 illustrates a flow chart of a method of in-storage processing performed in a PCIe AIC attached to an SSD, according to some example embodiments of the present invention.

FIG. 3 illustrates a flow chart of a method 300 of in-storage processing performed in a PCIe AIC attached to an SSD, according to an embodiment of the present invention. The PCIe AIC may be the PCIe AIC 100 of FIG. 1 and the SSD may be the SSD 118 of FIG. 1.

At 302, the PCIe AIC receives a command input from a host device connected to the PCIe AIC via a front end connector. For example, the PCIe AIC 100 may receive a command from the host device connected to the PCIe AIC 100 via the front end U.2 connector 106, requesting an image or a specific file stored in the SSD 118.

At 304, the PCIe AIC determines if the SSD attached to the PCIe AIC operating in a hardware acceleration mode (e.g., FPGA is present). For example, upon receiving a command from the host device, the PCIe AIC 100 may determine if the SSD 118 is operating in a hardware acceleration mode.

If at 304, the PCIe AIC determines that the SSD attached to the PCIe AIC operating in a hardware acceleration mode, at 306, the PCIe AIC receives the entire or partial set of data stored in the SSD attached to the PCIe AIC. For example, upon receiving the command from the host device requesting an image or a specific file stored in the SSD 118, instead of transferring the entire data set stored in the SSD 118 to the host device for the host CPU to process the data and recover the requested image or file, one or more local CPUs located near the PCIe AIC 100 may transfer the entire or partial data set stored in the SSD 118 to the PCIe AIC 100.

At 308, the transferred data set from the SSD may be stored at a plurality of local memories located near the PCIe AIC. For example, the transferred data from the SSD 118 may be stored temporarily in the plurality of DDR4 memories located near the PCIe AIC 100 during the processing of the transferred data from the SSD 118 by the one or more local CPUs located near the PCIe AIC 100.

At 310, the PCIe AIC processes the entire or partial set of data stored in the SSD attached to the PCIe AIC based on the command received from the host device. For example, the PCIe AIC 100 may process the transferred data from the SSD 118 to determine the image or specific file requested by the host device in the command received at the PCIe AIC 100.

At 312, the PCIe AIC may return the results to the host device. For example, once the transferred data from the SSD 118 is processed successfully, the PCIe AIC may return the final result (e.g., the requested image or file) to the host device. In some example embodiments, the results from the intermittent steps of the processing operation by the one or more local CPUs located near the PCIe AIC 100 may be stored in the plurality of DDR4 memories located near the PCIe AIC 100.

The in-storage processing approach (e.g., method 300) using the PCIe AIC 100 close to the data source (e.g., SSD 118) may drastically reduce the amount of data to be transferred to the host, and in turn, may ensure all components (e.g., PCIe AIC 100) along the data path of the SSD 118 are utilized in a balanced way. Since, the amount of data transferred between the PCIe AIC and the host device may be much less than the amount of data transferred between the PCIe AIC and the SSD 118, the energy and bandwidth required to transfer data stored in the SSD 118 to the host device may be saved. In some example embodiments, in order to transfer data stored in an external storage (e.g., SSD) to a host device may require 10,000 times more energy than the energy required to transfer data between a storage device (e.g., SSD) and an FPGA directly connected to the storage device. As such, the method 300 may provide a faster and more efficient solution of processing data in a storage device, for example, SSD 118.

Figure 4:
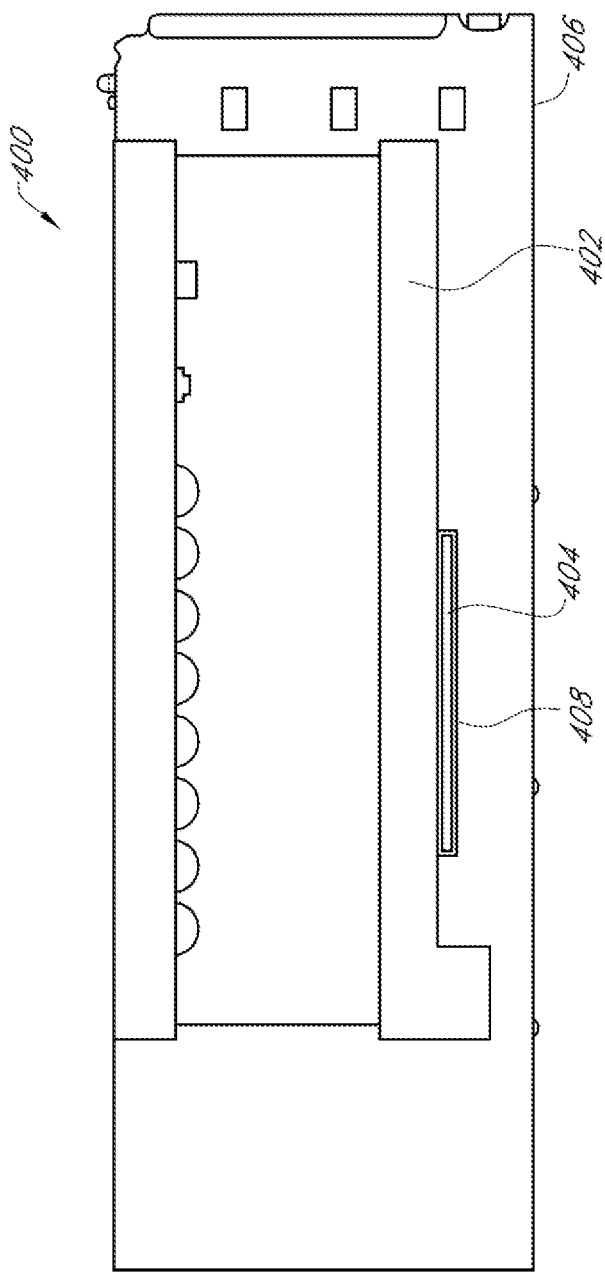
FIG. 4 illustrates a top view of an assembly, according to some example embodiment of the present invention.

FIG. 4 illustrates a top view of an assembly 400, according to some example embodiment of the present disclosure. The assembly may be the device 200 in a metal casing 202 of FIG. 2. In some example embodiments, the SSD 402 may be the SSD module 204 of FIG. 2, the PCB 406 may be the FPGA PCB 216 of FIG. 2, the connector 404 may be the vertical (90°) PCIe edge connector 206 of FIG. 2, and the receptacle 408 may be the PCIe receptacle connector 254 of FIG. 2. In some example embodiments, the connector 404 may be a SFF-TA-1008 connector. In some example embodiments, a 7.5×76×104.9 mm SFF-TA-1008 connector may support up to 25 W, a 7.5×76×142.2 mm SFF-TA-1008 connector may support up to 35 W, a 16.8×76×104.9 mm SFF-TA-1008 connector may support up to 70 W, and a 16.8×76×142.2 mm SFF-TA-1008 connector may support up to 70 W.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although exemplary embodiments of a supply modulator for power amplifier have been specifically described and illustrated herein, many modifications and variations will be apparent to those skilled in the art. Accordingly, it is to be understood that a system and method for supporting a FPGA based AIC SSD constructed according to principles of this invention may be embodied other than as specifically described herein. The invention is also defined in the following claims, and equivalents thereof.

What is claimed is:
1. A device comprising:
 a printed circuit board (PCB);
 a solid state drive (SSD) connected at a first side of the PCB via at least one SSD connector;

at least one field programmable gate array (FPGA) attached to the PCB at a second side of the PCB, the second side of the PCB being different from the first side of the PCB; and at least one front end connector attached to the PCB, wherein the device is configured to process data stored in the SSD based on a command received via the at least one front end connector, wherein the SSD is a peripheral component interconnect express (PCIe) add-in-card (AIC) SSD and the at least one SSD connector is a PCIe edge connector.

2. The device of claim 1, wherein the at least one SSD connector comprises a first SSD connector and a second SSD connector, the first SSD connector being the PCIe edge connector and the second SSD connector being a PCIe receptacle connector, the PCIe edge connector being a vertical PCIe edge connector.

3. The device of claim 2, wherein a first side of the vertical PCIe edge connector is attached and electrically connected to the PCIe AIC SSD at a first side of the PCIe AIC SSD and a second side of the vertical PCIe edge connector is electrically connected and attached to a first side of the PCIe receptacle connector, a second side of the PCIe receptacle connector being electrically connected and attached to the first side of the PCB.

4. The device of claim 1, further comprising a first structural support, a second structural support, a third structural support, and a fourth structural support, wherein the first structural support and the second structural support are located between the second side of the PCB and a first side of the SSD, and wherein the third structural support and the fourth structural support are located between the second side of the PCB and a first side of a metal casing, wherein the device is enclosed in the metal casing and the first structural support, the second structural support, the third structural support, and the fourth structural support are metal standoffs.

5. The device of claim 1, wherein a length of the SSD is 110 mm and a length of the device is between 110 mm and 142.2 mm.

6. The device of claim 1, wherein a first side of the at least one FPGA is attached to the second side of the PCB, the at least one FPGA is electrically connected to the PCB and performs one or more acceleration functions.

7. The device of claim 6, further comprising a first interface layer attached at a second side of the SSD and a second interface layer attached at a second side of the at least one FPGA, wherein the first interface layer and the second interface layer are used to transfer heat generated by the SSD and the at least one FPGA during operation of the SSD and the at least one FPGA.

8. The device of claim 1, wherein a length of the PCB is equal to or longer than a length of the SSD.

9. The device of claim 1, wherein a length of the PCB is equal to or longer than a length of the at least one FPGA, the length of the at least one FPGA is 80 mm.

10. The device of claim 1, wherein the SSD is a U.2 SSD or a SFF-TA-1008 SSD, wherein when the SSD is the U.2 SSD, the at least one SSD connector is a U.2 connector and when the SSD is the SFF-TA-1008 SSD, the at least one SSD connector is a SFF-TA-1008 connector.

11. The device of claim 1, wherein the at least one front end connector is an U.2 connector or a SFF-TA-1008 connector and the at least one front end connector is attached to the PCB at a third side of the PCB.

12. The device of claim 11, wherein a 7.5×76×104.9 mm SFF-TA-1008 connector supports up to 25 W, a 7.5×76×142.2 mm SFF-TA-1008 connector supports up to 35 W, a 16.8×76×104.9 mm SFF-TA-1008 connector supports up to 70 W, and a 16.8×76×142.2 mm SFF-TA-1008 connector supports up to 70 W.

* * * * *